Patented Apr. 18, 1939

2,154,598

UNITED STATES PATENT OFFICE 2,154,598

ETHERS OF THE ALKYL ESTERS OF HYDROXY BENZOIC ACIDS

Shailer L. Bass, Midland, Mich., and Edward M. Van Duzee, deceased, late of Midland, Mich., by Clarence H. Macomber, administrator, Midland, Mich., assignors to The Dow Chemical Company, Midland, Mich., a corporation of Michigan No Drawing. Application August 27, 1937, Serial No. 161,286

6 Claims. (Cl. 260—474)

The present invention concerns a new class of compounds, namely, the aralkyl ethers of the hydroxy-benzoic acid esters and such derivatives thereof as contain aryl, alkyl, or halogen substituents in the hydroxylated benzene ring.

Certain of the above compounds have been prepared and the physical properties thereof determined whereby they may be readily identified. These compounds have been found particularly useful as intermediates for the manufacture of pharmaceuticals, and as plasticizing agents for cellulose derivatives, such as ethyl cellulose. The invention, then, lies in the new products hereinafter fully described and particularly pointed out in the claims.

These new compounds can be prepared by treating the alkali metal salt of a hydroxy-substituted benzoic acid ester compound directly with an aralkyl halide.

For example, the hydroxy-benzoic acid ester compound, e. g., the benzyl ester of 4-hydroxy-benzoic acid, is added to a solution produced by digesting metallic sodium in alcohol, thereby producing an alcoholic solution of the sodium salt of said hydroxy-benzoate. An aralkyl halide is then introduced slowly into said sodium oxybenzoate solution maintained at its refluxing temperature, to form the desired ether product. The reaction mixture is then cooled and diluted with several volumes of water to precipitate a crude ether product, which may be separated in any convenient manner, e. g., by extraction with an organic solvent, decantation, etc. The crude product so obtained is washed with water and purified, as by distillation or fractional crystallization, to obtain the desired ether-ester in substantially pure form.

The new compounds may also be obtained by (1) reacting a hydroxy-benzoic acid ester compound with an aralkyl halide in the presence of an aqueous or aqueous alcoholic solution of sodium hydroxide or other suitable alkali, (2) by esterifying an aralkyl ether of a hydroxy-benzoic acid with an aliphatic alcohol, cycloaliphatic alcohol, araliphatic alcohol, etc., (3) by reacting upon a suitable dimetallic salt of a hydroxy-benzoic acid with an aralkyl halide or a mixture comprising an aralkyl halide and an alkyl halide, or (4) by reacting upon the alkali metal salt of an aralkyl ether of hydroxy-benzoic acid with a suitable alkyl halide.

The following examples describe in detail the preparation of certain specific members of this new class of compounds, but are offered only to illustrate the invention, and are not to be construed as limiting the same.

Example 1

23 grams (1 mole) of metallic sodium was digested with 500 milliliters of absolute alcohol, and then 151.5 grams (1 mole) of benzyl 4-hydroxy-benzoate, i. e., the benzyl ester of 4-hydroxy-benzoic acid, reacted therewith to form an alcoholic solution of the sodium salt of the hydroxy-substituted benzoic acid ester. This solution was warmed to its refluxing temperature and 126.5 grams (1 mole) of benzyl chloride added over a period of 1 hour. Refluxing was continued thereafter for 1 hour under atmospheric pressure, after which the reaction mixture was cooled and diluted with approximately 3 volumes of water. A dark oil separated from the aqueous alcoholic suspension and was extracted with benzene, washed with water to remove suspended sodium chloride, filtered and the benzene removed by distillation at atmospheric pressure. The dark viscous residue obtained thereby was fractionally distilled under reduced pressure, whereby there was obtained 79 grams (0.248 mole) of the benzyl ether of benzyl 4-hydroxy-benzoate as a white crystalline solid boiling between 191° and 193° C. at 3 millimeters pressure and freezing at approximately 31.7° C.

Example 2

23 grams (1.0 mole) of metallic sodium was dissolved in 400 millimeters of alcohol, and 209.1 grams (1.0 mole) of isoamyl salicylate added thereto, whereby there was obtained an alcoholic solution of the sodium salt of the salicylate. 126.5 grams (1.0 mole) of benzyl chloride was reacted therewith as described in Example 1, the product being 150.7 grams of benzyl ether of isoamyl salicylate, which is a substantially odorless, water-white liquid boiling at 170°–174° C. at 3 millimeters pressure, and having a specific gravity of 1.130 at 20°/4° C.

Among other aralkyl ethers of the hydroxy-benzoic acid esters which may be prepared according to the above-described procedure are compounds of salicylic acid, 3-hydroxy-benzoic acid, 4-hydroxy-benzoic acid, and nuclear substituted derivatives thereof, in which the etherifying and esterifying groups differ from those shown in the examples. For example, by substituting other aralkyl halides and hydroxy benzoic acid ester compounds for those previously shown, compounds may be prepared such as 4-chloro-benzyl ether of the cyclohexyl ester of salicylic acid, 2-bromo-benzyl ether of the normal-propyl ester of 3-methyl-salicylic acid, i. e., benzyl ether of normal-propyl ortho-cresotinate, 2,4-dichloro-benzyl ether of isopropyl salicylate, 2-bromo-phenyl-ethyl ether of isohexyl salicylate, phenyl-amyl ether of the normal-butyl ester of 3-phenyl-salicylic acid, phenyl-ethyl ether of the secondary-butyl ester of 5-chloro-salicylic acid, phenyl-octyl ether of the tertiary-butyl ester of 3,5-dichloro-4-hydroxy-benzoic acid, 4-bromo-benzyl ether of the benzyl ester of 4-hydroxy-benzoic acid, phenyl-hexyl ether of the tertiary-octyl ester of 3-bromo-4-hydroxy-benzoic acid, phenyl-propyl ether of the cyclo-pentyl ester of 3-methyl-4-hydroxy-benzoic acid, benzyl ether of normal-propyl 3-hydroxy benzoate, 3-chloro-benzyl ether of the phenyl-ethyl ester of 3-hydroxy benzoic acid, the phenyl-butyl ether of the isobutyl ester of 3-hydroxy-benzoic acid, etc.

In place of the sodium salts employed in the above examples, other alcohol soluble metal salts of hydroxy benzoates may be employed, e. g. the potassium compounds, etc. Similarly, the aralkyl bromides may be substituted for the aralkyl chlorides.

The compounds to which this invention particularly relates having the following formula

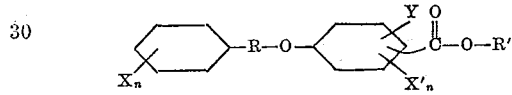

wherein X and X' represent hydrogen or halogen, each $n$ is an integer not greater than 2, R is an alkylene group, R' is a hydrocarbon radical containing at least 3 carbon atoms selected from the group consisting of the alkyl, cycloalkyl, and aralkyl radicals, and Y represents an alkyl or aryl radical or hydrogen.

The present application is a continuation in part of our co-pending application Serial Number 97,188, filed August 21, 1936.

Other modes of applying the principle of the invention may be employed instead of those explained, change being made as regards the materials employed, provided the products described in the following claims be thereby obtained.

We therefore particularly point out and distinctly claim as the invention:

1. A benzyl ether of a salicylate compound having the formula

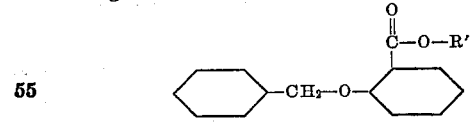

wherein R' represents an alkyl radical containing at least 3 carbon atoms.

2. Benzyl ether of isoamyl salicylate.

3. An aralkyl ether of a hydroxy-benzoic acid ester compound having the formula

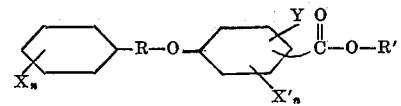

wherein X and X' each represents a member of the class consisting of hydrogen and halogen, each $n$ is an integer not greater than 2, R is an alkylene group, R' is an alkyl radical containing at least 3 carbon atoms, and Y represents a member of the group consisting of the alkyl and aryl radicals and hydrogen.

4. An aralkyl ether of a hydroxy-benzoic acid ester compound having the formula

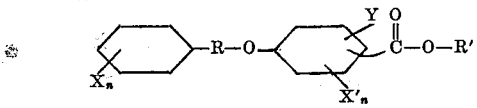

wherein X and X' each represents a member of the class consisting of hydrogen and halogen, each $n$ is an integer not greater than 2, R is an alkylene group containing from 1 to 8 carbon atoms, inclusive, R' is an alkyl radical containing at least 3 carbon atoms, and Y represents a member of the group consisting of the alkyl and aryl radicals and hydrogen.

5. An aralkyl ether of a hydroxy-benzoic acid ester compound having the formula

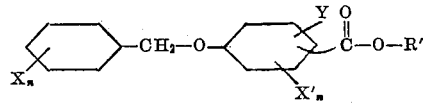

wherein X and X' each represents a member of the class consisting of hydrogen and halogen, each $n$ is an integer not greater than 2, R' is an alkyl radical containing at least 3 carbon atoms, and Y represents a member of the group consisting of the alkyl and aryl radicals and hydrogen.

6. A benzyl ether of a hydroxy-benzoic acid ester compound having the formula

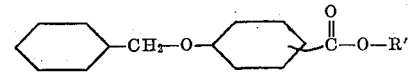

wherein R' is an alkyl radical containing at least 3 carbon atoms.

SHAILER L. BASS.
CLARENCE H. MACOMBER,
*Administrator of the Estate of Edward M. Van Duzee, Deceased.*